US010547219B2

(12) United States Patent
Nonaka et al.

(10) Patent No.: US 10,547,219 B2
(45) Date of Patent: Jan. 28, 2020

(54) ROTATING ELECTRIC MACHINE HAVING AIR CORE COIL WITH CURVED END SURFACES

(71) Applicant: KABUSHIKI KAISHA YASKAWA DENKI, Kitakyushu-shi (JP)

(72) Inventors: Tuyoshi Nonaka, Kitakyushu (JP); Shogo Makino, Kitakyushu (JP); Mitsunori Kamo, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 672 days.

(21) Appl. No.: 15/247,929

(22) Filed: Aug. 26, 2016

(65) Prior Publication Data
US 2016/0365758 A1 Dec. 15, 2016

Related U.S. Application Data

(63) Continuation of application No. PCT/JP2014/057604, filed on Mar. 19, 2014.

(51) Int. Cl.
*H02K 3/12* (2006.01)
*H02K 1/16* (2006.01)
*H02K 15/04* (2006.01)
*H01F 5/04* (2006.01)
*H02K 3/22* (2006.01)

(52) U.S. Cl.
CPC ............... *H02K 1/16* (2013.01); *H01F 5/04* (2013.01); *H02K 3/12* (2013.01); *H02K 3/22* (2013.01); *H02K 15/045* (2013.01)

(58) Field of Classification Search
CPC .......... H02K 15/045; H02K 1/16; H02K 3/12; H02K 3/18; H02K 3/22
See application file for complete search history.

(56) References Cited

U.S. PATENT DOCUMENTS 8,115,353 B2 *  2/2012  Urano ............... H02K 3/18
                                              310/71
8,872,397 B2 * 10/2014  Nonaka ............. H02K 1/148
                                              29/605
9,824,806 B2 * 11/2017  Nonaka ............. H01F 27/022
(Continued)

FOREIGN PATENT DOCUMENTS

JP    2004-248440    9/2004
JP    2004-254421    9/2004
(Continued)

OTHER PUBLICATIONS

JP200950116 English Translation.*
(Continued)

*Primary Examiner* — Mang Tin Bik Lian
*Assistant Examiner* — Maged M Almawri
(74) *Attorney, Agent, or Firm* — Mori & Ward, LLP

(57) ABSTRACT

This disclosure discloses a rotating electric machine including a rotor and a stator. The rotating electric machine includes a stator core including a teeth part, and an air core coil. The air core coil is fitted to the teeth part. The air core coil includes curved end surfaces configured to approximately define a part of cylindrical shape at inner radial side and outer radial side. The air core coil includes approximately flat end surfaces at both circumferential sides and both axial sides.

11 Claims, 14 Drawing Sheets

(56) References Cited

U.S. PATENT DOCUMENTS

| | | | |
|---|---|---|---|
| 9,938,353 B2* | 4/2018 | Dinarello | C07K 14/8125 |
| 2003/0098630 A1* | 5/2003 | Owada | H02K 3/24 |
| | | | 310/194 |
| 2007/0114878 A1* | 5/2007 | Tatebe | H02K 1/148 |
| | | | 310/400 |
| 2009/0322180 A1* | 12/2009 | Nonaka | H02K 5/08 |
| | | | 310/215 |
| 2010/0026133 A1* | 2/2010 | Fubuki | H02K 3/18 |
| | | | 310/208 |
| 2012/0000069 A1* | 1/2012 | Hagi | H01R 43/28 |
| | | | 29/864 |
| 2012/0025663 A1* | 2/2012 | Makino | H02K 15/0031 |
| | | | 310/215 |
| 2012/0146434 A1* | 6/2012 | Nonaka | H02K 1/148 |
| | | | 310/43 |
| 2012/0286593 A1 | 11/2012 | Yokogawa et al. | |
| 2012/0293024 A1 | 11/2012 | Yokogawa et al. | |
| 2013/0009495 A1* | 1/2013 | Ueno | H02K 3/44 |
| | | | 310/43 |
| 2013/0342054 A1* | 12/2013 | Long | H02K 21/24 |
| | | | 310/71 |
| 2014/0035428 A1* | 2/2014 | Yuya | H02K 3/522 |
| | | | 310/215 |
| 2014/0333171 A1* | 11/2014 | Lange | H02K 3/18 |
| | | | 310/208 |
| 2015/0001984 A1* | 1/2015 | Bradfield | H02K 3/493 |
| | | | 310/216.069 |
| 2015/0123509 A1* | 5/2015 | Nonaka | H01F 27/022 |
| | | | 310/208 |
| 2015/0187477 A1* | 7/2015 | Makino | H01F 5/00 |
| | | | 310/12.22 |
| 2015/0188371 A1* | 7/2015 | Kato | H02K 3/12 |
| | | | 310/208 |
| 2015/0188372 A1* | 7/2015 | Yokota | H02K 3/34 |
| | | | 310/43 |
| 2017/0163133 A1* | 6/2017 | Egashira | H02K 15/0056 |
| 2017/0324286 A1* | 11/2017 | Akimoto | H02K 1/16 |

FOREIGN PATENT DOCUMENTS

| | | | |
|---|---|---|---|
| JP | 2005-027442 | | 1/2005 |
| JP | 2006-087244 | | 3/2006 |
| JP | 2009-050116 | | 3/2009 |
| JP | 200950116 | * | 5/2009 |
| JP | 2011-205877 | | 10/2011 |
| WO | WO 2008/149649 | | 12/2008 |
| WO | WO 2014/030214 | | 2/2014 |
| WO | WO 2014/030359 | | 2/2014 |
| WO | WO2014049847 | * | 3/2014 |

OTHER PUBLICATIONS

Japanese Office Action for corresponding JP Application No. 2016-508404, dated Dec. 20, 2017.

International Search Report for corresponding International Application No. PCT/JP2014/057604, dated Jun. 17, 2014.

Written Opinion for corresponding International Application No. PCT/JP2014/057604, dated Jun. 17, 2014.

Japanese Office Action for corresponding JP Application No. 2016-508404, dated Jun. 15, 2017 (w/ English machine translation).

International Preliminary Report on Patentability with Translation of Written Opinion of the International.

* cited by examiner

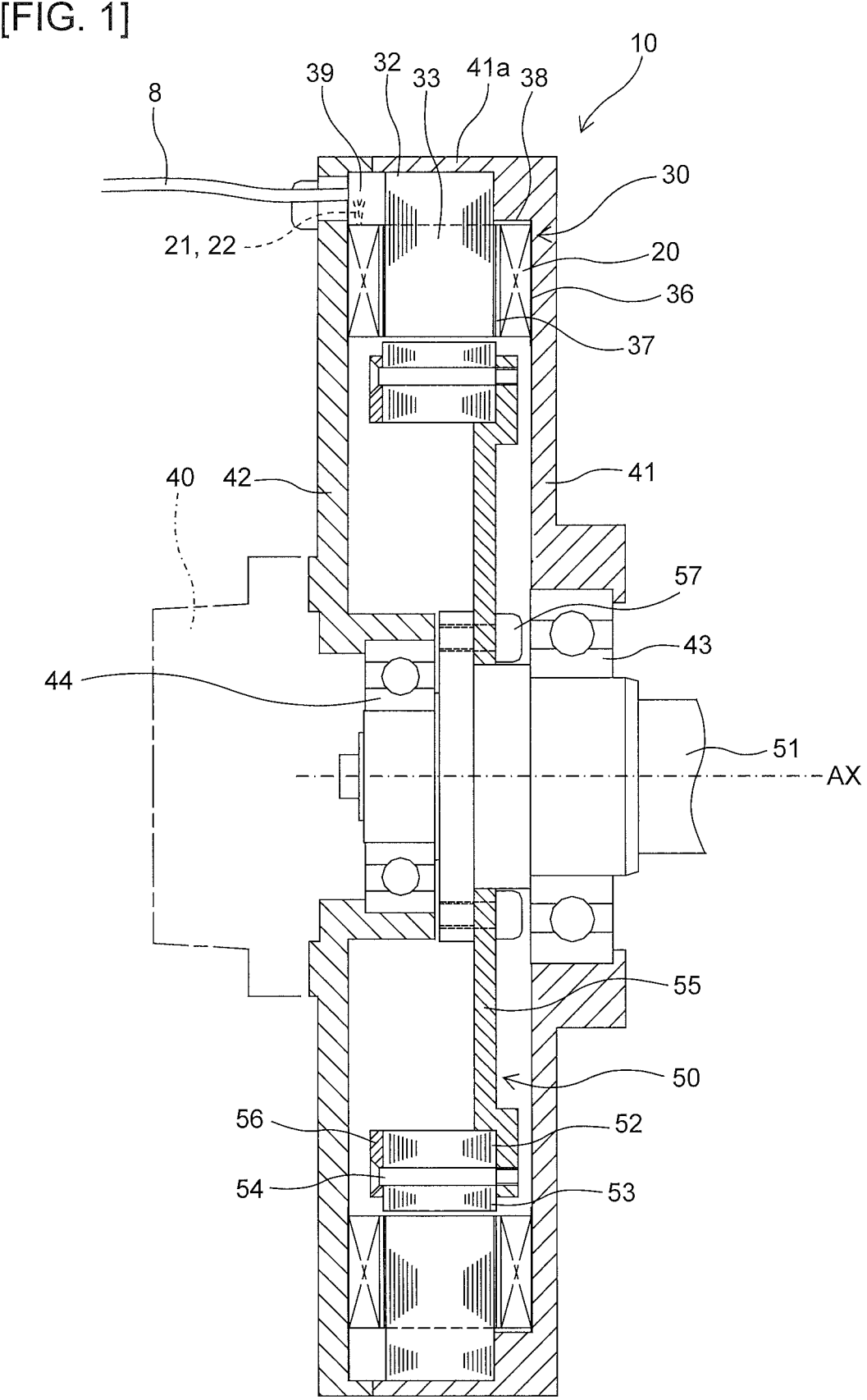
[FIG. 1]

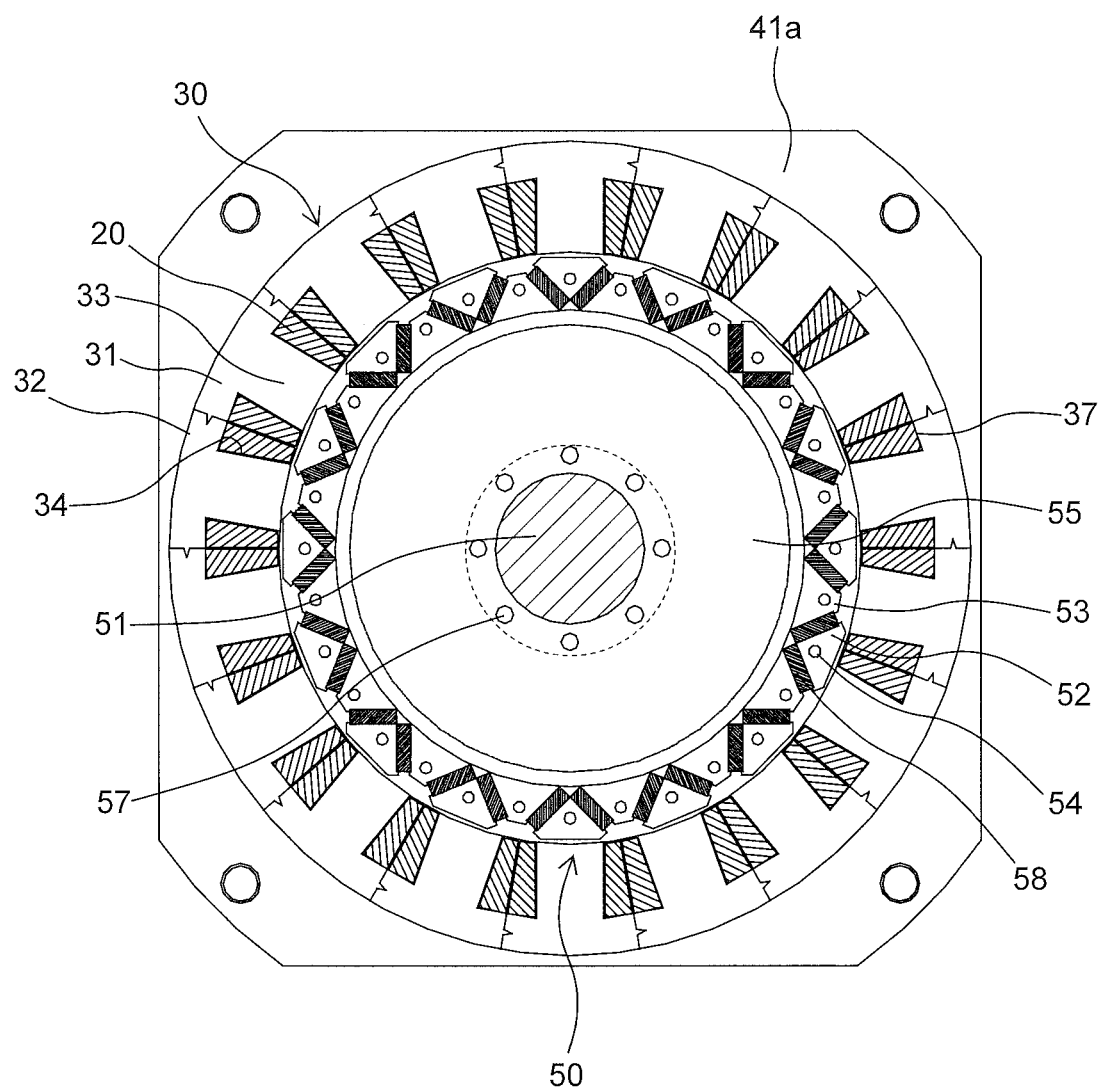
[FIG. 2]

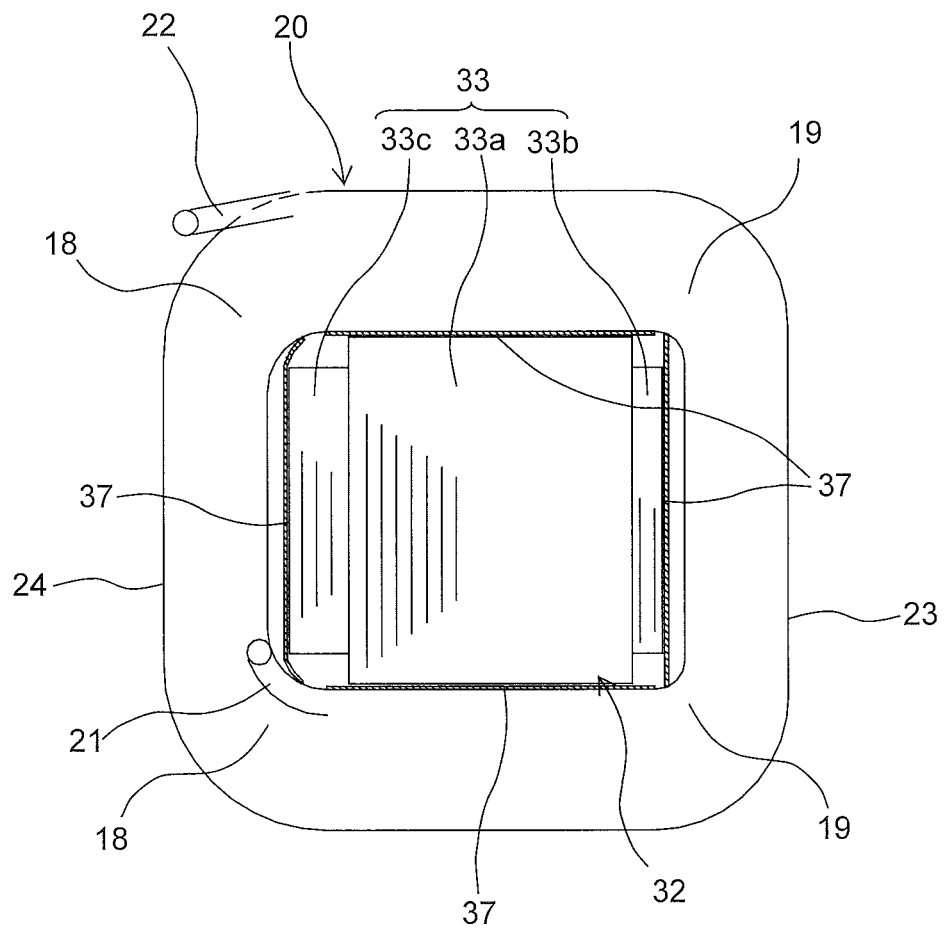
[FIG. 3]

[FIG. 4A]
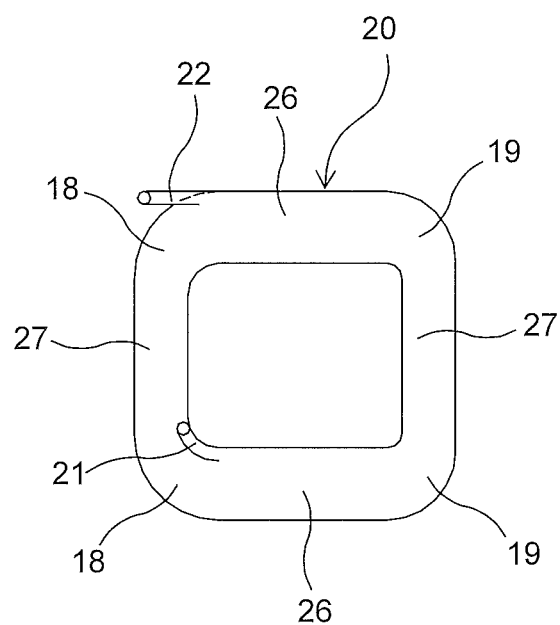
[FIG. 4B]
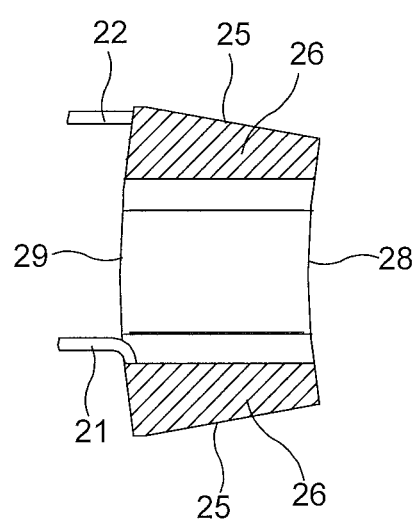
[FIG. 4C]
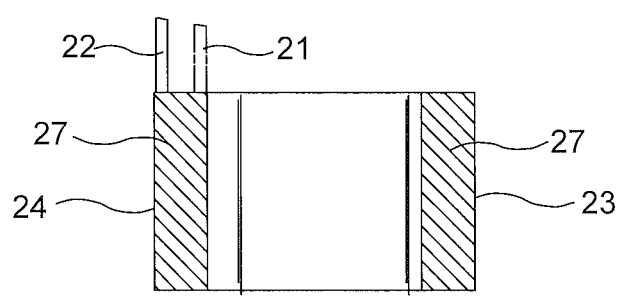

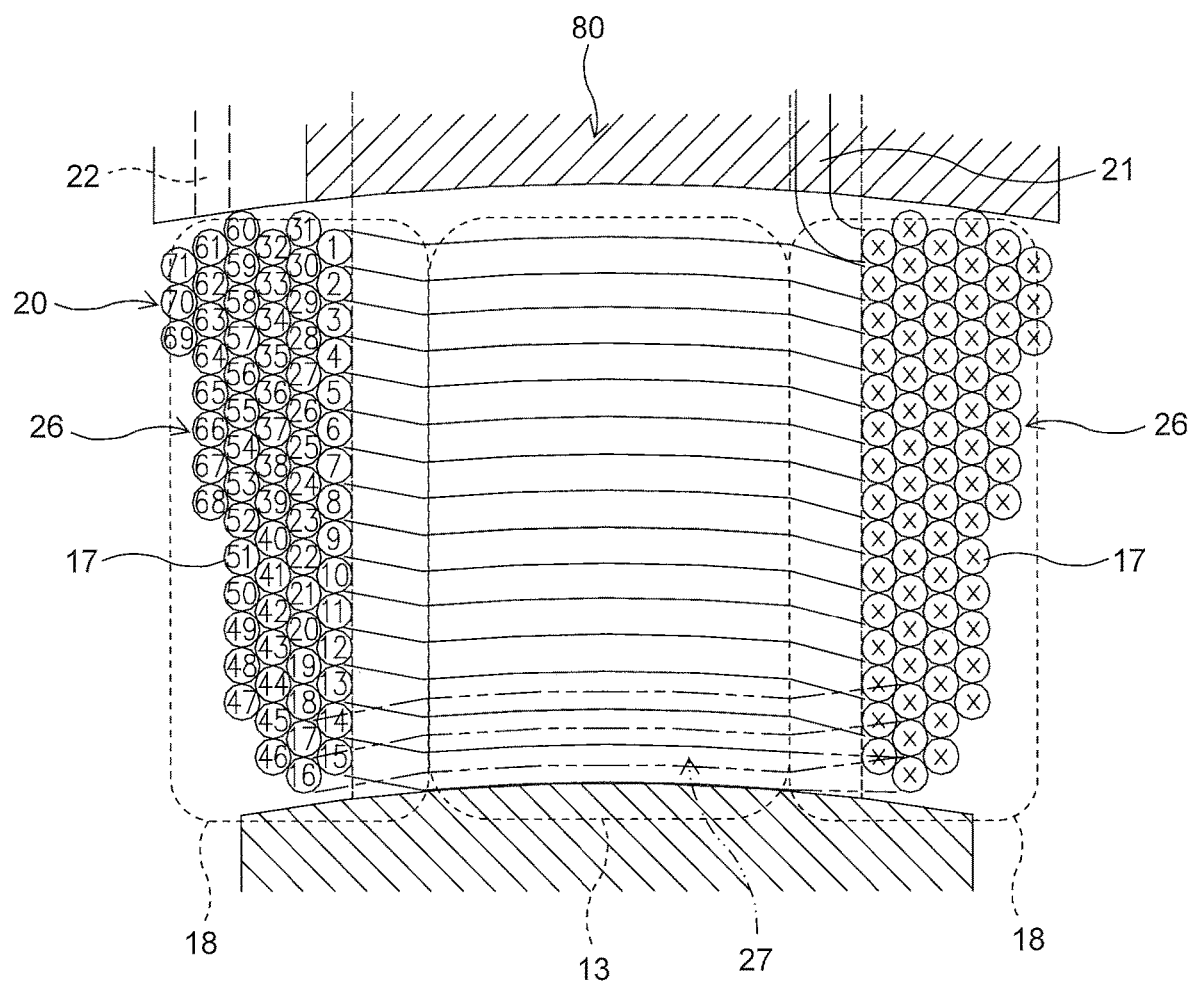
[FIG. 5]

[FIG. 6A] 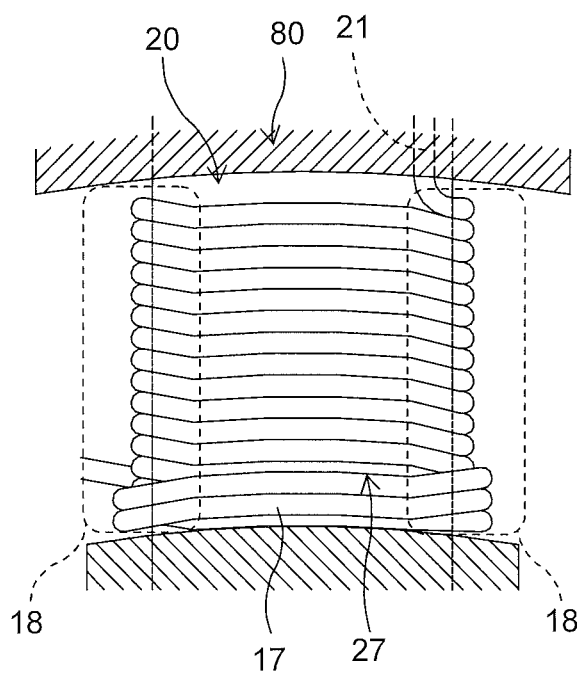
[FIG. 6B] 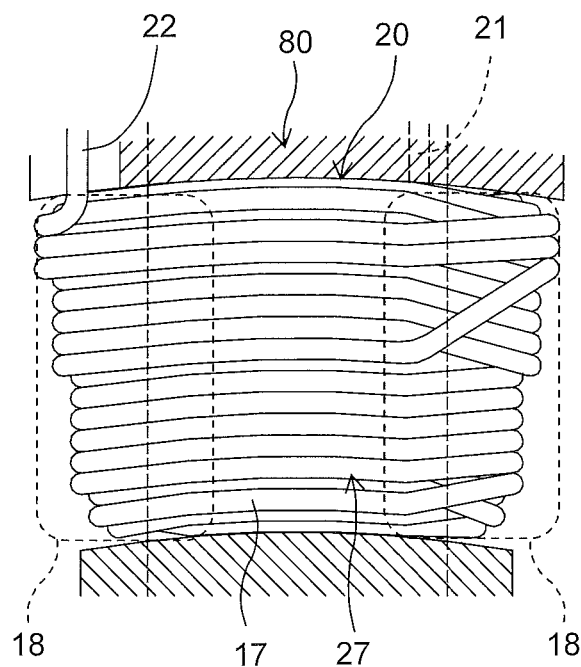

[FIG. 7A]
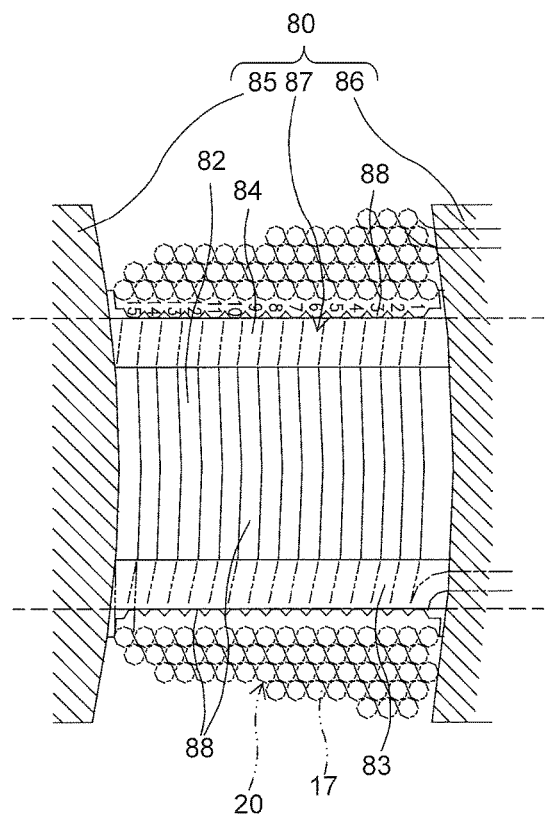
[FIG. 7B]
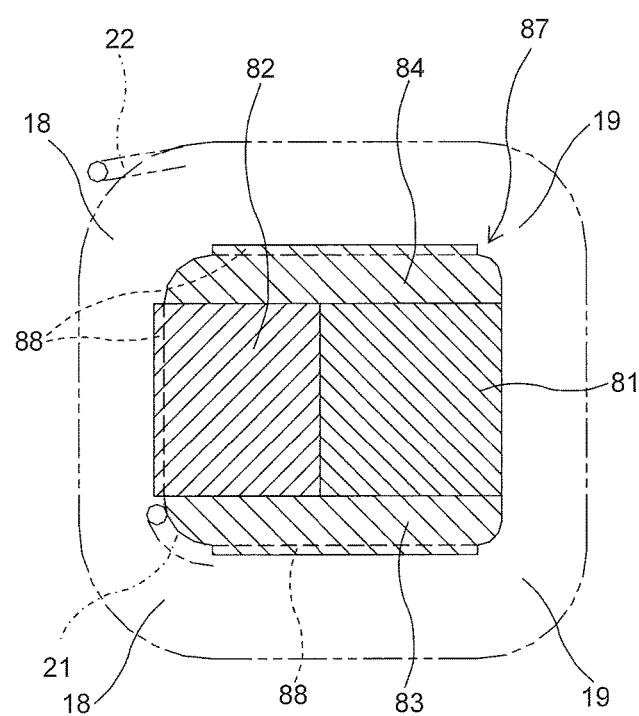
[FIG. 7C]
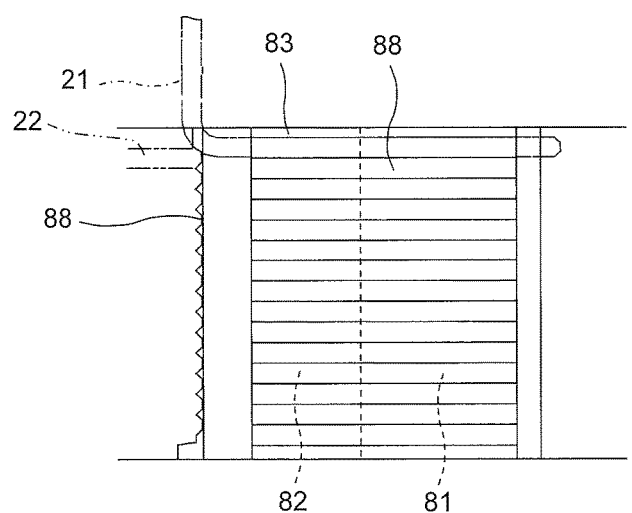

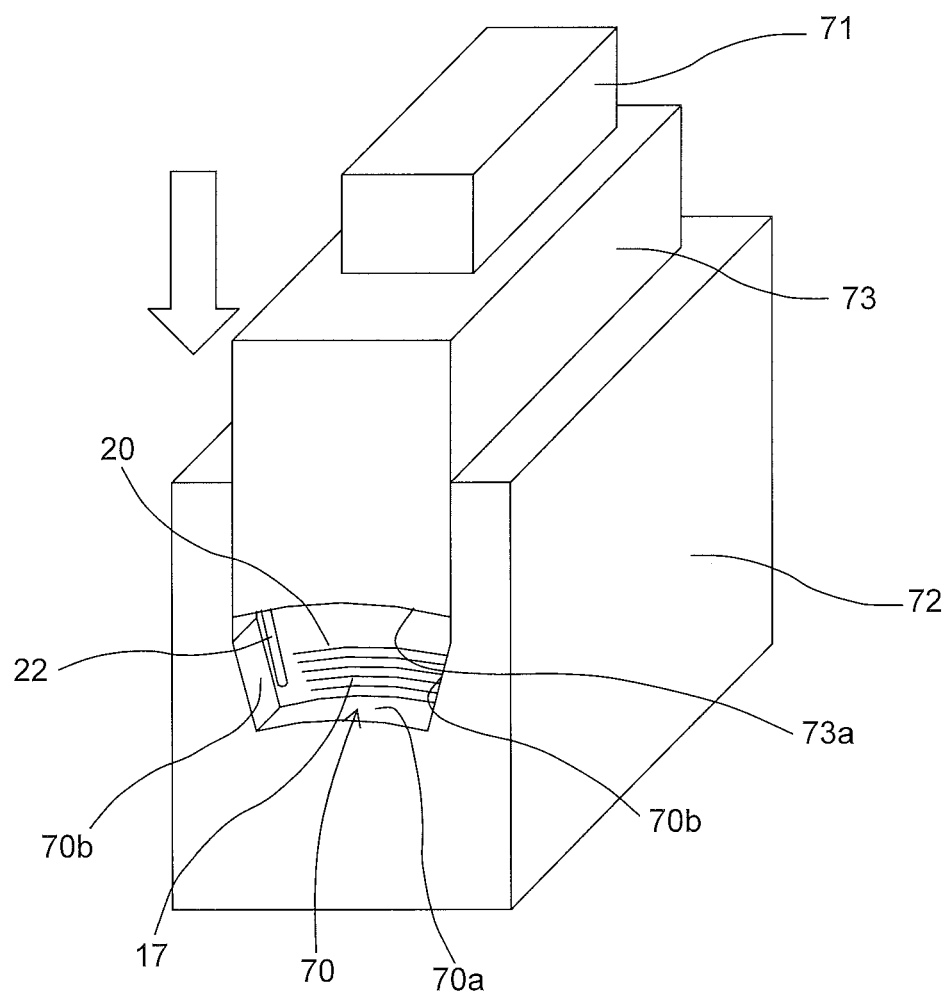
[FIG. 8]

[FIG. 9]
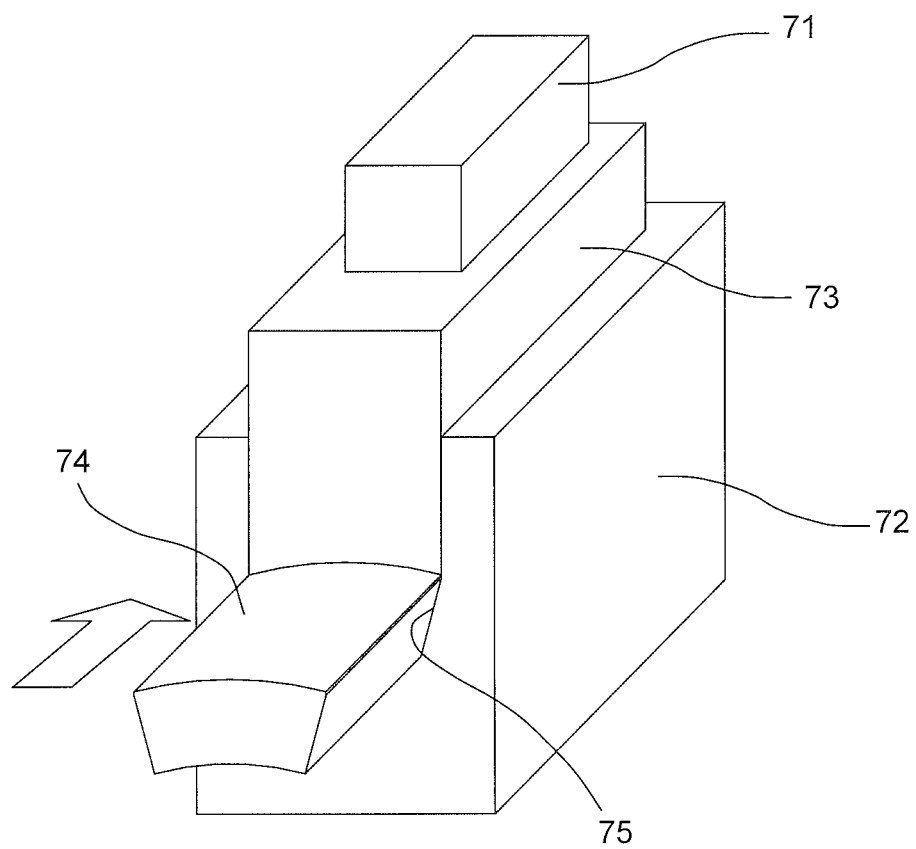

[FIG. 10]
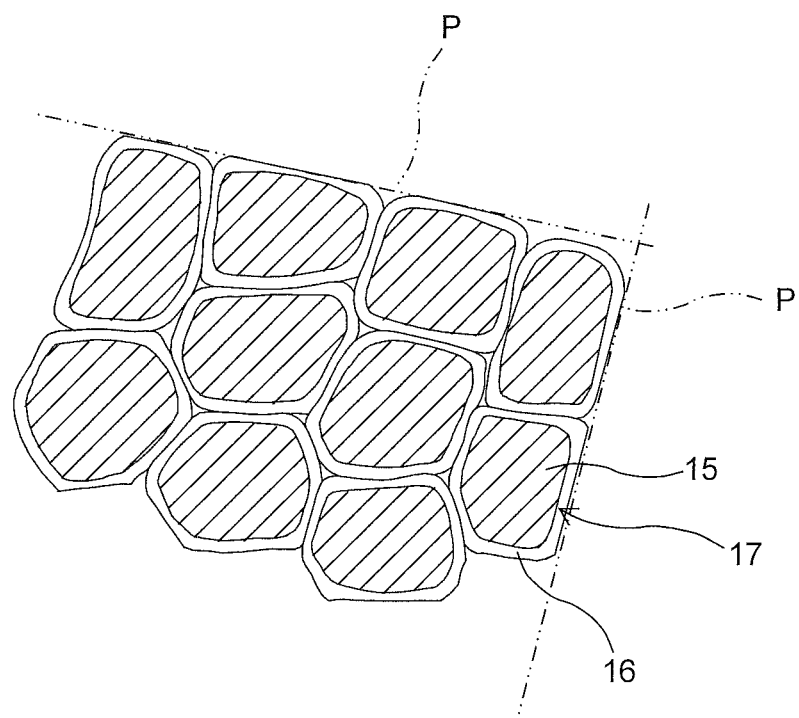

[FIG. 11]
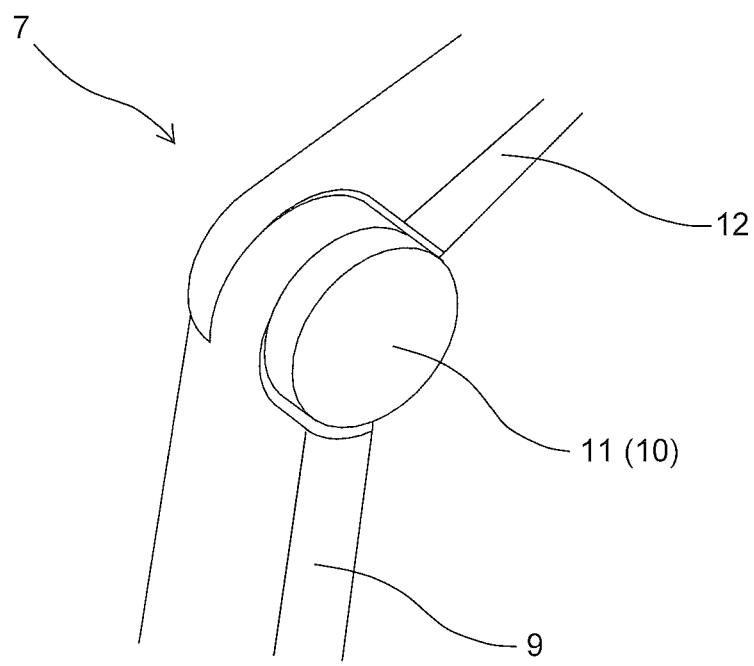

[FIG. 12]
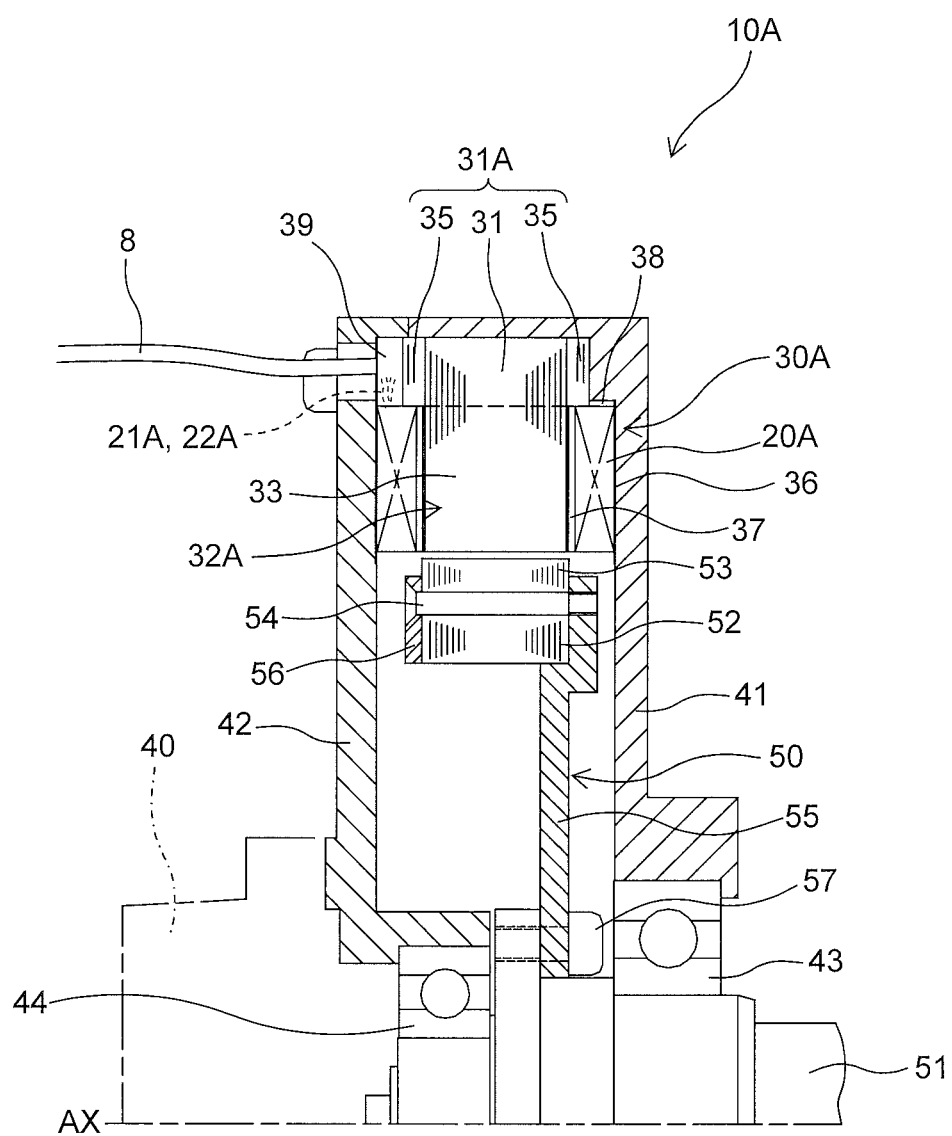

[FIG. 13]
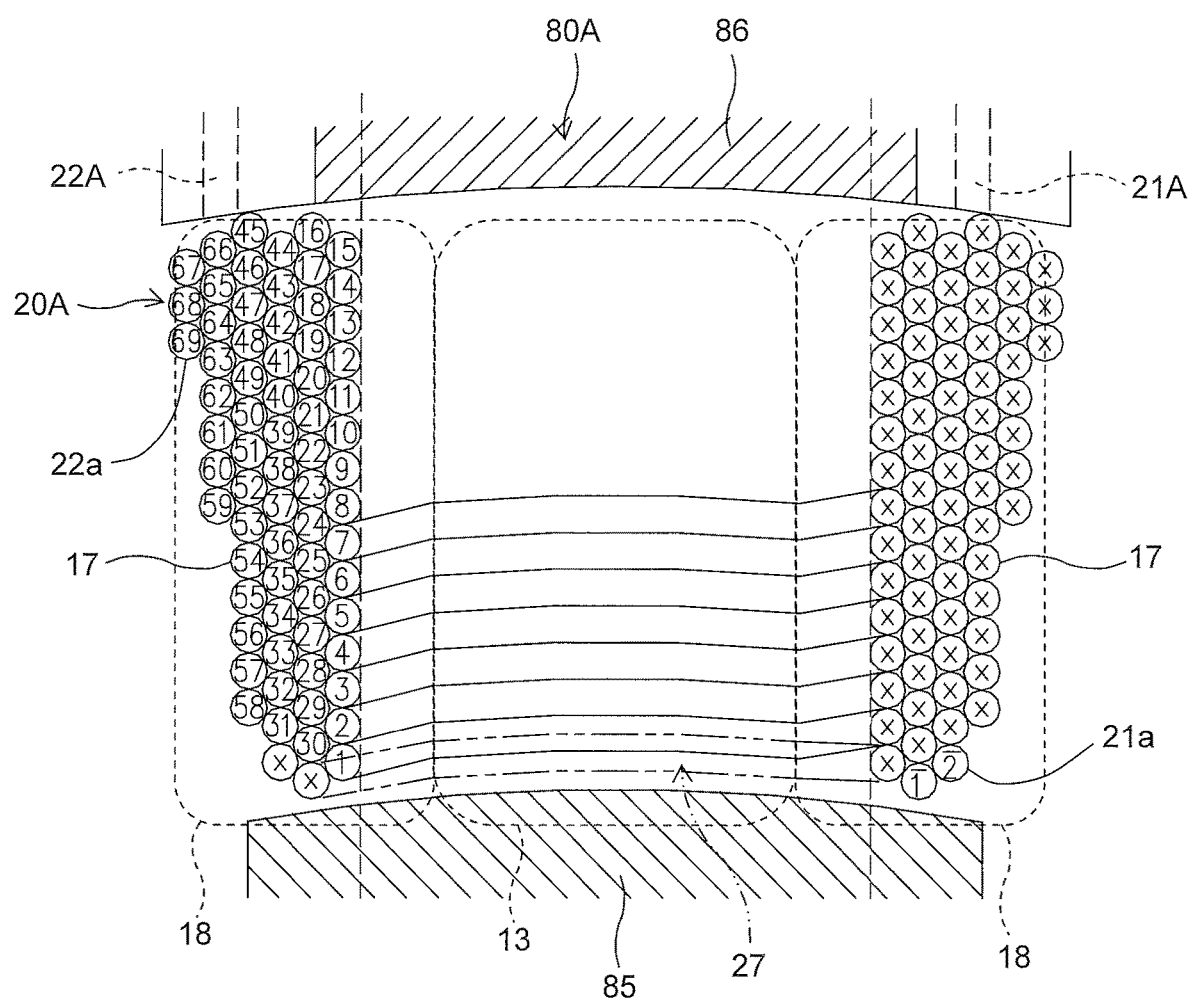

[FIG. 14A]
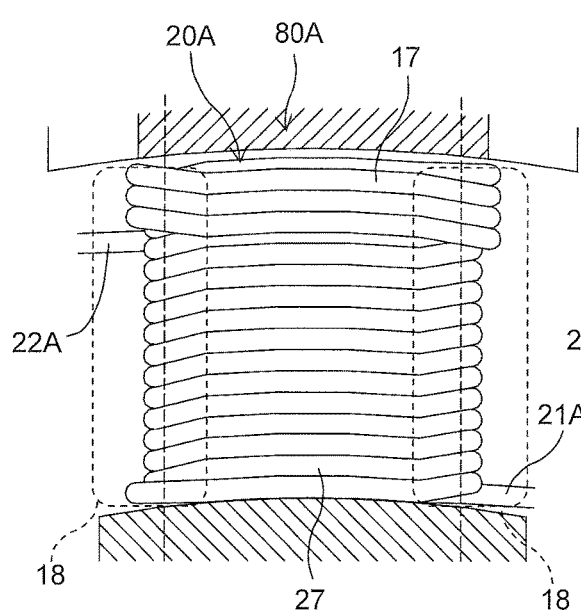
[FIG. 14B]
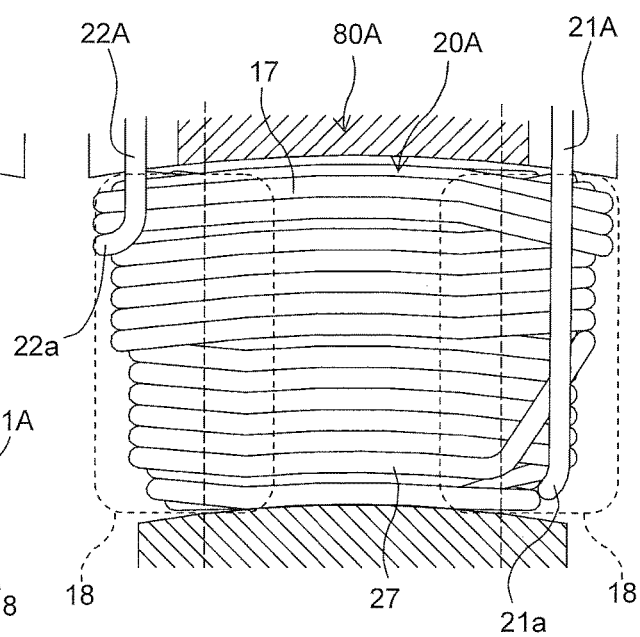

ial side while being separated from the stator 30 # ROTATING ELECTRIC MACHINE HAVING AIR CORE COIL WITH CURVED END SURFACES

CROSS-REFERENCE TO RELATED APPLICATION

This is a continuation application of PCT/JP2014/057604, filed Mar. 19, 2014, which was published under PCT article 21(2).

TECHNICAL FIELD

Embodiments of the disclosure relate to a rotating electric machine and a method for producing a rotating electric machine.

BACKGROUND

A rotating electric machine having a load-side coil end of a stator coil in tight contact with a concave part of a load-side bracket via an insulator on at least two surfaces of the coil end among an inner circumferential surface, an outer circumferential surface and an end surface is known.

SUMMARY

According to one aspect of the disclosure, there is provided a rotating electric machine including a rotor and a stator. The rotating electric machine includes a stator core including a teeth part, and an air core coil. The air core coil is fitted to the teeth part. The air core coil includes curved end surfaces configured to approximately define a part of cylindrical shape at inner radial side and outer radial side. The air core coil includes approximately flat end surfaces at both circumferential sides and both axial sides.

BRIEF DESCRIPTION OF THE DRAWING

FIG. 1 is an axial sectional view of a rotating electric machine according to a first embodiment.

FIG. 2 is a transverse sectional view of the rotating electric machine according to the first embodiment.

FIG. 3 is a plan view showing an air core coil mounted on a teeth part of a stator core.

FIG. 4A is a plan view of the air core coil.

FIG. 4B is a circumferential sectional view of the air core coil.

FIG. 4C is an axial sectional view of the air core coil.

FIG. 5 is an explanatory view showing a winding structure of the air core coil.

FIG. 6A is an explanatory view showing a winding method of the air core coil.

FIG. 6B is an explanatory view showing a winding method of the air core coil.

FIG. 7A is a front view of a winding jig for the air core coil.

FIG. 7B is a horizontal sectional view of the winding jig for the air core coil.

FIG. 7C is a side view of the winding jig for the air core coil.

FIG. 8 is an explanatory view showing a pressure molding of the air core coil by using an upper punch.

FIG. 9 is an explanatory view showing a pressure molding of the air core coil by using a horizontal punch.

FIG. 10 is an explanatory view showing an example of a cross section of the winding of the pressure molded air core coil.

FIG. 11 is an explanatory view showing an example of usage of the rotating electric machine.

FIG. 12 is an axial sectional view of a rotating electric machine according to a second embodiment.

FIG. 13 is an explanatory view showing the winding structure of the air core coil.

FIG. 14A is an explanatory view showing the winding method of the air core coil.

FIG. 14B is an explanatory view showing the winding method of the air core coil.

DESCRIPTION OF THE EMBODIMENTS

Hereinafter, an embodiment will be described referring to the drawings. Note that, use of expressions such as "upper", "lower", "left", and "right" in the explanation of components of the rotating electric machine herein is not intended to restrict the positional relationships among respective components of the rotating electric machine.

1. First Embodiment

1-1. Schematic Structure of Rotating Electric Machine

The schematic structure of the rotating electric machine according to the first embodiment will be described referring to FIGS. 1 and 2. As FIGS. 1 and 2 show, a rotating electric machine 10 of the present embodiment includes a stator 30, and a rotor 50 disposed inside the stator 30, which is formed as a flat motor of inner rotor type having a reduced axial length. The rotating electric machine 10 may be used for a motor 11 or the like which drives a joint part 7 of an industrial robot, for example, as shown in FIG. 11 to be described later.

The rotating electric machine 10 includes a shaft 51 which is rotatably supported with an opposite load-side bracket 42 (corresponding to an example of a housing) disposed at one axial side of the rotating electric machine 10 (left side of FIG. 1), and a load-side bracket 41 (corresponding to an example of a housing) disposed at the other axial side thereof (right side of FIG. 1) via an opposite load-side bearing 44 and a load-side bearing 43, respectively. An encoder 40 is disposed at an opposite load-side end of the shaft 51. However, the encoder 40 does not necessarily have to be disposed. The load-side bracket 41 includes an integrally formed cylindrical frame 41a. The frame 41a, the load-side bracket 41, and the opposite load-side bracket 42 constitute a housing of the rotating electric machine 10.

Note that, in the specification, the term "load-side" denotes the side at which the shaft 51 protrudes from the rotating electric machine 10 (right side of FIG. 1), and the term "opposite load side" denotes the side in the reverse direction of the load side, that is, the side at which the encoder 40 is mounted on the rotating electric machine 10 (left side of FIG. 1).

1-2. Rotor Structure

The rotor 50 is disposed on the shaft 51 at the outer circumferential side while being separated from the stator 30 with a magnetic gap in the radial direction. The rotor 50 includes a plurality of circumferentially arranged permanent magnets 58, and outer rotor cores 52 and inner rotor cores 53. Those cores interpose outer and inner radial sides of the permanent magnet 58, respectively. The plurality of pairs of permanent magnets 58 (in this example, 16 pairs), each pair of which forms substantially a V-like shape with a view from an axial direction, is circumferentially arranged. Each pair of the permanent magnets 58 is configured to have magnetic poles facing each other with the same polarity of either N-pole or S-pole. Those magnets are arranged into the formation having the same magnetic poles of N-poles and those of S-poles alternately arranged with repetition. The permanent magnets 58, the outer rotor cores 52, and the inner rotor cores 53 are interposed between an annular large-diameter load-side plate 55 fixed to the shaft 51 with a bolt 57 and an annular opposite load-side plate 56 with narrow width disposed at an opposite load side of the load-side plate 55. The permanent magnets 58, and the rotor cores 52, 53 are integrally fixed by bolts 54 which pierce through the rotor cores 52, 53 for connection between the load-side plate 55 and the opposite load-side plate 56, and supported with the shaft 51 via the load-side plate 55.

1-3. Stator Structure

The stator 30 includes a teeth part 33 protruding radially inward from a yoke part 31, a plurality of (in this example, 18) stator cores 32 annularly connected while being circumferentially arranged on the inner circumferential surface of the frame 41a, and a plurality of (in this example, 18) air core coils 20 (corresponding to an example of the stator coil) fitted to the teeth part 33. A slot 34 is formed between the adjacent teeth parts 33, 33. The air core coil 20 fitted to the teeth part 33 has both circumferential ends fitted in the slot 34. A lead end 21 of the air core coil 20 at winding start side and a lead end 22 of the air core coil 20 at winding end side are drawn radially outward from the opposite load side of the air core coil 20. They are connected at a connection part 39 so as to be connected to an external power supply cable 8.

As FIG. 3 shows, the teeth part 33 includes a center teeth part 33a as the center in the axial direction (lateral direction of FIG. 3), a load-side teeth part 33b and an opposite load-side teeth part 33c both slightly protruding axially from both sides of the center teeth part 33a. Each dimension of the load-side teeth part 33b and the opposite load-side teeth part 33c in the circumferential direction (vertical direction of FIG. 3) is made smaller than that of the center teeth part 33a. The opposite load-side teeth part 33c has the axial dimension larger than that of the load-side teeth part 33b. Insulators 37 are interposed between the air core coil 20, and the load-side teeth part 33b, the opposite load-side teeth part 33c, the center teeth part 33a, respectively. Insulators 36 are disposed in tight contact between end surfaces 23, 24 at both axial sides of the air core coil 20, and the load-side bracket 41, the opposite load-side bracket 42, respectively as shown in FIG. 1. The insulating sheet may be used as the insulator 36, for example. However, it is possible to use the molding material for coating the air core coil 20, and the coating material applied onto the bracket surface. A mold resin part 38 is also disposed, which is integrally resin molded with the stator core 32, the air core coil 20, and the insulator 36.

Note that, referring to FIG. 3, in angular parts 18 at both opposite load sides of the air core coil 20, the winding position of a winding 17 of the air core coil 20 (see FIG. 5 which will be described later) is shifted. In angular parts 19 at both load sides of the air core coil 20, the winding position of the winding 17 is not shifted. As described above, the axial dimension of the opposite load-side teeth part 33c is longer than that of the load-side teeth part 33b. Therefore, each curvature radius of the two angular parts 18 at the opposite load side becomes larger than that of the two angular parts 19 at the load side.

1-4. Shape of Air Core Coil

As FIG. 4B shows, the air core coil 20 includes curved end surfaces 28, 29 each partially constituting the substantially cylindrical part at the inner side (right side of FIG. 4B) and the outer side (left side of FIG. 4B) in the radial direction, respectively. The air core coil 20 includes substantially planar end surfaces 25, 25 at both circumferential sides (upper side and lower side of FIG. 4B), respectively. The air core coil 20 includes substantially planar end surfaces 23, 24 both at the load side and the opposite load side in the axial direction as shown in FIG. 4C. Each plane of those end surfaces 23, 24 is perpendicular to a rotation axis AX (see FIG. 1) of the rotor 50.

Note that, such terms as "curved end surface" and "planar end surface" in the above description do not mean the "curved surface" and the "planar surface" in the strict sense. Specifically, each of the end surfaces 28, 29 denotes the "substantially curved" end surface which is formed through the pressure molding with a curved press jig. Therefore, such shape may include the small concave and convex portions as a result of outline of the winding 17, and the recess formed by the gap from the press jig owing to the coil end surface shape. This applies also to the end surfaces 23, 24, 25, that is, the end surface is "substantially planar", formed through the pressure molding with the flat press jig. Such shape may include the small concave and convex portions as a result of outline of the winding 17, and the recess formed by the gap from the press jig owing to the coil end surface shape.

The air core coil 20 includes slot mounting parts 26 each fitted in the slot 34 at both circumferential sides, and coil end parts 27 disposed at both axial sides of the stator core 32. As FIG. 4B shows, the cross section of the slot mounting part 26 in the circumferential direction has a fan-like shape having the dimension substantially enlarged radially outward. The cross section of the coil end part 27 in the axial direction has substantially a rectangular shape as FIG. 4C shows.

The shape of the air core coil 20 as described above allows formation of an accurate cylindrical shape by arranging a plurality of (in this example, 18) air core coils 20 fitted to the stator core 32 in the circumferential direction. This makes it possible to constitute the stator 30 having the air core coils 20 in tight contact with the brackets 41, 42.

1-5. Structure of Air Core Coil Winding

As FIG. 5 shows, the windings 17 for forming the air core coil 20 are arranged in alignment on four planar parts 13 at both circumferential sides (left and right sides of FIG. 5), and both axial sides (far side and near side of FIG. 5). The winding position of the winding 17 is shifted in two angular parts at one side of the air core coil 20 in the axial direction, that is, only in the angular parts 18 at both opposite load sides (near side of FIG. 5) according to the present embodiment.

Note that, FIG. 5 shows a circumferential cross section of the air core coil 20 as viewed from the coil end part 27 at the opposite load side before execution of the pressure molding process. The lead end 21 at the beginning of winding is introduced from the outer radial side of a winding jig 80 so as to start winding of the winding 17 ("wire"). Each of X marks attached to the winding 17 at the right side of FIG. 5 denotes the winding 17 which will be fed into the slot mounting part 26 at the right side of FIG. 5 and wound toward the load side (far side of FIG. 5). Each number attached to the winding 17 at the left side of FIG. 5 denotes the winding order of the winding 17 fed into the slot mounting part 26 at the left side of FIG. 5 so as to be wound toward the opposite load side (order of winding in accordance with the generally employed winding order from inner to the outer side). The normal winding is made entirely between the slot mounting part 26 and the load-side coil end part 27. The winding position of the winding 17 is not shifted. The coil end part 27 at the opposite load side is of normal winding type, while being positionally shifted by a half pitch from the other normal winding part. The winding position is shifted in the angular parts 18 at both sides of the opposite load-side coil end part 27 so as to make the half-pitch shifting.

As a result of shifting the winding position of the winding 17 in the opposite load-side angular parts 18, the normal winding may be made in the four planar parts 13 at both sides in the circumferential direction and the axial direction. This makes it possible to execute pressure molding of all the six surfaces of the outer part of the air core coil 20 including the opposite load-side coil end part 27. Note that the area in which the winding position of the winding 17 is shifted is not limited only to the opposite load-side angular parts 18. The shifting is allowed in any two angular parts selected from four angular parts 18, 18, 19, 19.

FIG. 6A shows the condition at the time of starting winding of the winding 17 of the air core coil 20, and FIG. 6B shows the condition at the time of ending winding of the winding 17 of the air core coil 20. Note that, FIG. 6A shows the state in the middle of making the second layer following completion of making the first layer from the winding start of the winding 17.

Referring to the winding 17 of the air core coil 20 to be wound around the winding jig 80 as shown in FIG. 6A, the lead end 21 at the winding start side is drawn from the first layer at the outer radial side in the angular part 18 at one (right side of FIG. 6A) of the opposite load sides (near side of FIG. 6A) of the air core coil 20. Meanwhile, the lead end 22 at the winding end side is drawn from the outermost layer of the coil to the outer radial side in the angular part 18 at the other (left side of FIG. 6B) opposite load side of the air core coil 20 as shown in FIG. 6B.

Note that, in the case that the connection part 39 is disposed at the load side of the stator core 32, two lead ends 21, 22 may be drawn from the two load-side angular parts 19, 19. For example, in the case that the connection part 39 is disposed at the inner radial side of the coil end part 27, two lead ends 21, 22 may be drawn radially inward of the coil end part 27.

1-6. Structure of Winding Jig

After the winding 17 is wound around the winding jig 80 which is shaped to allow winding at the fixed position, the air core coil 20 is set in the flat mold for pressure molding. As FIGS. 7A, 7B, 7C show, the winding jig 80 includes a winding jig body 87 inside the air core coil 20, and a radial inner jig 85 and a radial outer jig 86, both of which are fitted with both radial sides (both left and right sides of FIG. 7A) of the winding jig body 87. In this example, the winding jig body 87 is formed by combining four jigs including a load-side jig 81, an opposite load-side jig 82, a right circumferential jig 83, and a left circumferential jig 84 as shown in FIG. 7B.

Each of the opposite load-side jig 82, the right circumferential jig 83, and the left circumferential jig 84 has a groove 88 for guiding the first-layer winding 17 of the air core coil 20. As a result, the groove 88 allows the winding 17 to be fixedly positioned on the winding jig 80. The groove 88 of the opposite load-side jig 82 is positionally half-pitch shifted from the right circumferential jig 83 and the left circumferential jig 84 as the other grooved jigs.

The load-side jig 81 of the winding jig body 87 is not grooved, which may be removed from the other opposite load-side jig 82, the right circumferential jig 83, and the left circumferential jig 84. After winding the winding 17 of the air core coil 20 around the winding jig 80, the load-side jig 81 will be removed first, and then, the opposite load-side jig 82, the right circumferential jig 83, and the left circumferential jig 84 will be removed. A flat core pin 71 (see FIGS. 8 and 9 to be described later) is set for the wound air core coil 20 so as to be pressure molded.

1-7. Pressure Molding of Air Core Coil

As described above, after the unmolded air core coil 20 is formed by winding the winding 17 around the winding jig 80, the end surfaces of the air core coil 20 at inner and outer sides in the radial direction are pressure molded by using the curved press jig which constitutes a part of the cylindrical shape. Then, end surfaces of the air core coil 20 at both sides in the circumferential and axial directions are pressure molded by using the flat press jig. The pressure molding of the air core coil 20 will be described referring to FIGS. 8 and 9.

As FIG. 8 shows, the core pin 71 is first set for the unmolded air core coil 20 formed by winding the winding 17. Then, the core pin 71 is mounted on the upper punch 73 so as to be set in a molding hole 70 of a die 72 which accommodates the upper punch 73.

The molding hole 70 is a bottomed hole opened to the front and rear sides corresponding to both axial sides of the air core coil 20. The molding hole 70 includes a molding surface 70a for an inner radial side for molding an outer shape of the inner radial side of the air core coil 20, and a pair of molding surfaces 70b for a circumferential direction for molding the outer shape of the air core coil 20 at both circumferential sides. The molding surface 70a has a curved shape that constitutes a part of the cylindrical shape. Specifically, it is the curved wall surface having a convex portion with the predetermined curvature, protruding upward corresponding to the outer shape of the air core coil 20 at the inner radial side. The pair of molding surfaces 70b are planar, specifically, the inclined wall surfaces rising to extend from the left and right sides of the molding surface 70a while being inclined corresponding to the outer shape of the air core coil 20 at both circumferential sides. The upper punch 73 includes a molding surface 73a for molding the outer shape of the air core coil 20 at the outer radial side. The molding surface 73a has a curved surface that constitutes a part of the cylindrical shape, specifically, the curved wall surface having the concave part directed upward with the predetermined curvature corresponding to the outer shape of the air core coil 20 at the outer radial side.

Upon setting of the air core coil 20 in the molding hole 70 of the die 72, the upper punch 73 is lowered to the die 72 by a predetermined amount as indicated by white arrow of FIG. 8. As a result, the die 72 and the upper punch 73 press the end surfaces of the air core coil 20 at both radial sides so as to pressure mold the outer shape of the air core coil 20 at both radial sides. The end surfaces of the air core coil 20 at both circumferential sides are pressed so as to pressure mold the outer shape of the air core coil 20 at both circumferential sides.

Referring to FIG. 9, the horizontal punches 74 are inserted, respectively, into the pair of openings 75 forming at front and rear sides between the upper punch 73 and the die 72 as white arrow of FIG. 9 shows. The horizontal punch 74 has a lateral cross section corresponding to the circumferential cross section of the air core coil 20. The wall surface of the horizontal punch 74 in contact with the air core coil 20 is planar, specifically, the perpendicular molding surface having a fan-like outline corresponding to each end surface of the air core coil 20 at both axial sides. As each of the horizontal punches 74 is moved forward by a predetermined amount after insertion into the opening 75 of the die 72, the end surfaces of the air core coil 20 at both axial sides are pressed for executing the pressure molding so that the outer shape of the air core coil 20 at both axial sides becomes the end surface substantially perpendicular to the rotation axis AX.

In this way, the pressure molding of the air core coil 20 is completed. Subsequently, the molded air core coil 20 is resin molded by using the resin material with thermosetting property, for example, to provide the finished air core coil 20 for the use in the present embodiment.

Note that, the upper punch 73 with the molding surface 73a, and the die 72 with the molding surface 70a correspond to an example of the curved press jig. The die 72 with the pair of molded surfaces 70b and the horizontal punch 74 correspond to an example of the flat press jig.

1-8. Winding Deformation Due to Pressure Molding

FIG. 10 is a sectional view of the respective windings 17 of the pressure molded air core coil 20. The winding 17 is formed by coating a conductor 15 with an insulating layer 16 such as enamel. The conductor 15 may be made of, for example, copper or aluminum. Note that the conductor 15 made of aluminum allows weight reduction of the air core coil 20, and accordingly, weight reduction of the stator 30, and the rotating electric machine 10 in the final outcome. The winding 17 is shaped to have the circular cross section plastically deformed (for example, substantially rectangular shape or polygonal shape) as a result of pressure molding. The mark P in the drawing indicates the molding surface 70b of the die 72 or the molding surface of the horizontal punch 74. This indicates that the end surface of the air core coil 20 is formed into substantially flat shape through the pressure molding process. This makes it possible to realize the air core coil 20 having each end surface shaped as desired while improving the space factor.

1-9. Usage of Flat Motor

For example, the motor used for driving the joint part of the industrial robot has been required to be flat shaped for the purpose of preventing enlargement of the joint part. FIG. 11 shows an example of the joint part of the industrial robot. The joint part 7 for the industrial robot is configured to connect a base arm 9 and a leading arm 12 with a motor 11 for driving the joint part 7 so as to rotate the leading arm 12 with respect to the base arm 9.

The rotating electric machine 10 according to the present embodiment is capable of constituting the axially flat motor, and accordingly, suitable for the use as the motor 11 for driving the joint part 7 and the like of the industrial robot.

The structure which allows the normal winding in the four planar parts 13 at both sides in the circumferential and axial directions while shifting the winding position of the winding 17 of the air core coil 20 only in the angular parts 18 at the opposite load side, and the structure which draws the lead ends 21, 22 in the angular parts 18 correspond to an example of means for enabling a pressure molding of end surfaces of the air core coil at both radial sides, both axial sides and both circumferential sides.

1-10. Advantageous Effects of the First Embodiment

As described above, the rotating electric machine 10 according to the first embodiment includes the stator core 32 having the teeth parts 33, and the air core coil 20 fitted to the teeth part 33 and having end surfaces 28, 29 each of which is curved for constituting the part of substantially cylindrical shape at inner and outer radial sides, end surfaces 25, 25 each of which is substantially flat at both circumferential sides, and end surfaces 23, 24 each of which is substantially flat at both axial sides.

As the air core coil 20 includes the end surfaces 23, 24 which are substantially flat at both axial sides, those end surfaces 23, 24 may be brought into sufficiently close contact with the load-side bracket 41 and the opposite load-side bracket 42, thus improving heat radiation property. As the end surfaces 23, 24 at both axial sides are formed into flat shapes through the pressure molding, each axial length of the coil end parts 27, 27 at both axial sides may be reduced. Therefore, the rotating electric machine 10 may be realized which reduces the axial length without deteriorating the heat radiation property.

As the air core coil 20 includes the end surfaces 28, 29 which are substantially curved to constitute the part of substantially cylindrical shape at inner and outer radial sides, one accurate cylindrical shape is formed upon fitting of the plurality of air core coils 20 to the respective teeth parts 33. Compared with the coil with a mere trapezoidal cross section, the present disclosure increases the space factor.

Especially, in the present embodiment, the end surfaces 23, 24 of the air core coil 20 at both axial sides are formed as those in the planar direction perpendicular to the rotation axis AX of the rotor 50. With the arrangement, unlike the case in which the axial cross section of the coil end part 27 has a substantially fan-like shape with the dimension enlarged radially outward, the axial length of the air core coil 20 may be reduced. As a result, the rotating electric machine 10 having the flat shape with reduced axial length is realized.

Especially, in the present embodiment, the cross section of the slot mounting part 26 of the air core coil 20 in the circumferential direction has a fan-like shape with the dimension substantially enlarged radially outward. The cross section of the coil end part 27 in the axial direction has substantially the rectangular shape. This makes it possible to configure the stator with higher space factor.

Especially, in the present embodiment, the air core coil 20 is configured to allow each cross section of the winding 17 at the slot mounting part 26 and the coil end part 27 to contain the part plastically deformed from the round shape as a result of the pressure molding process. This makes it possible to realize the air core coil 20 having each of the end surfaces 23, 24, 25, 28, 29 formed to have the desired shape while improving the space factor.

Especially, in the present embodiment, the air core coil 20 includes two planar parts 13 (two planar parts including the end surfaces 25, 25) positioned at both circumferential sides, two planar parts 13 (two planar parts including the end surfaces 23, 24) positioned at both axial sides, and four angular parts 18, 18, 19, 19 positioned between adjacent planar parts 13, respectively. The winding 17 is arranged in alignment on the respective planar parts 13, each wound to allow shifting of the winding position at any two of the four angular parts 18, 18, 19, 19. Since the winding position of the winding 17 may be shifted only in the angular parts, the normal winding may be made in the four planar parts 13 at both circumferential sides and both axial sides. This makes it possible to execute the pressure molding of all six surfaces of the air core coil 20 including the end surface 24 at the opposite load-side coil end part 27.

Especially in the present embodiment, the air core coil 20 is configured to make each curvature radius of two angular parts 18 which allow shifting of the winding position of the winding 17 larger than each curvature radius of two angular parts 19 which allow no shifting of the winding position of the winding 17. As a result, the angular part for shifting of the winding position of the winding 17 is allowed to have the length (path length of the winding 17) required to make such shifting easily.

Especially in the present embodiment, the air core coil 20 includes two lead ends 21, 22 which have been radially drawn outward of the coil end part 27 from the two opposite load-side angular parts 18, 18. As a result, the structure may guide those two lead ends 21, 22 to the connection part 39 disposed at the outer radial side of the coil end part 27. As the two lead ends 21, 22 are drawn from the angular parts where the pressure molding process is not executed, damage to the lead ends owing to the pressure molding may be prevented.

Especially in the present embodiment, the lead end 21 at the winding start side is drawn from the first layer at the outer radial side in one of the opposite load-side angular parts 18. The lead end 22 at the winding end side is drawn from the outermost layer of the coil in the other opposite load-side angular part 18. As a result, the structure may realize the air core coil 20 of general winding type which is derived from winding the winding 17 to be laminated from the inner to the outer side.

Especially in the present embodiment, the insulators 36 are disposed between the end surfaces 23, 24 of the air core coil 20 at the both axial sides, and the load-side bracket 41 and the opposite load-side bracket 42, respectively in the tight contact state. As a result, the structure ensures insulation between the air core coil 20, and the load-side bracket 41 and the opposite load-side bracket 42, respectively without deteriorating the heat radiation property of the rotating electric machine 10.

Especially, the present embodiment includes the mold resin part 38 integrally formed by molding the stator core 32, the air core coil 20 and the insulator 36. As a result, the integrally formed stator 30 may improve workability of assembling the rotating electric machine 10, and prevent rattling between the stator core 32 and the air core coil 20, thus ensuring reliability with respect to insulation on a long-term basis.

Especially the present embodiment includes the connection part 39 disposed radially outside of the coil end part 27 of the air core coil 20 for connecting the lead ends 21, 22 of the air core coil 20. The connection part 39 disposed radially outside of the coil end part 27 ensures to prevent increase in the axial length of the rotating electric machine 10.

2. Second Embodiment

A second embodiment will be described referring to FIGS. 12 to 14.

2-1. Schematic Structure of Rotating Electric Machine

FIG. 12 shows a schematic structure of a rotating electric machine 10A according to the second embodiment. The rotating electric machine 10A includes a stator 30A differently structured from the stator 30 of the rotating electric machine 10 according to the first embodiment. Any other structures of the rotating electric machine 10A are similar to those of the rotating electric machine 10 according to the first embodiment. The same elements shown in FIG. 12 as those shown in FIG. 1 will be designated with the same codes, and explanations thereof, thus, will be omitted or only briefly explained.

A stator core 32A of the stator 30A according to the present embodiment includes a yoke part 31A formed of a yoke part 31 and annular cores 35, 35 disposed at both sides of the yoke part 31 in the axial direction. The structure allows the yoke part 31A to have the axial dimension larger than that of the teeth part 33. As a result, the inner diameter of the yoke part 31A may be increased while keeping the magnetic path size of the teeth part 33. The coil dimension of an air core coil 20A fitted to the teeth part 33 may be increased by the amount corresponding to the dimensional increase.

2-2. Structure of Air Core Coil Winding

Note that, assuming that the air core coil 20A is configured to allow the lead end 21 at the winding start side to be drawn radially outward of the first-layer coil end part 27 likewise the air core coil 20 as described in the first embodiment, there may cause the risk of interference with the annular cores 35. It is therefore necessary to apply countermeasures for providing the lead ends to prevent such interference with the annular cores 35.

As FIG. 13 shows, the present embodiment is configured to draw the lead end 21A at one side (corresponding to an example of the lead end at the winding end side) of the air core coil 20A radially outward of the coil end part 27 via the angular part 18 from the outermost layer of the coil at the inner radial side, and to draw the other lead end 22A (corresponding to an example of the lead end at the winding start side) outward of the coil end part 27 via the angular part 18 from the outermost layer of the coil.

The winding 17 to be wound for forming the air core coil 20A is of so-called a-winding type, and two lead ends 21A, 22A are formed at the outer side. Note that, likewise the first embodiment, the winding position of the winding 17 is shifted only in the angular parts 18 at both opposite load sides. The normal winding is made in the four planar parts 13 at both circumferential sides and axial sides, respectively. The pressure molding is executed to all the six surfaces of the outline of the air core coil 20A including the opposite load-side coil end part 27.

As FIG. 13 shows, the winding of the winding 17 is started from the inner radial side. The lead end 22A at one side is wound by making 15 turns radially outward of a winding jig 80A as a first layer, while winding to make the second layer, third layer, and sequentially to finally 69 turns (indicated by 22a) to form the sixth layer. The winding is then finished. The other lead end 21A is wound at the inner radial side to form the second layer, the third layer and the like. The winding ends after making 2 turns (indicated by 21a). The number of turns of the air core coil 20A is 71 which is the same as that of the air core coil 20 according to the first embodiment.

The winding jig 80A has the same shape as that of the winding jig 80 used in the first embodiment except that the position of the lead end 21A on the radial outer jig 86 is changed.

FIG. 14A shows the condition of starting the winding of the winding 17 of the air core coil 20A. FIG. 14B shows the condition of ending the winding of the winding 17 of the air core coil 20A. Note that, FIG. 14A shows the state in the middle of making the second layer, following completion of making the first layer from the start of winding of the winding 17.

The one lead end 21A of the air core coil 20A is drawn outward of the coil end part 27 from the outermost layer of the coil at the inner radial side via the angular part 18 at the right circumferential side of the opposite load-side coil end part 27. The other lead end 22A is drawn outward of the coil end part 27 from the outermost layer of the coil via the angular part 18 at the left circumferential side of the opposite load-side coil end part 27. This makes it possible to provide the air core coil 20A which ensures to guide the lead ends 21A, 22A to the connection part 39 with no interference with the annular cores 35 as shown in FIG. 12.

2-3. Advantageous Effect of the Second Embodiment

The second embodiment as described above is capable of realizing the air core coil 20A having both the lead ends 21A, 22A drawn from the outermost layer, that is, a-winding type. In this case, both the lead ends 21A, 22A may be drawn at the position axially outside of the coil end part 27. Even in the case that the axial dimension of the yoke part 31A of the stator core 32A is made larger than that of the teeth part 33, the interference between the lead ends 21A, 22A and the yoke part 31A may be prevented.

Especially in the present embodiment, the stator 30A includes a stator core 32A having the teeth part 33 and the yoke part 31A with the axial dimension larger than that of the teeth part 33. As a result, the structure allows increase in the inner diameter of the yoke part 31A while maintaining the size of the magnetic path of the teeth part 33. It is therefore possible to increase the dimension of the air core coil 20A by the amount corresponding to the dimensional increase. In the case that the dimension of the air core coil 20A is not increased, the outer diameter of the yoke part 31A may be decreased, thus reducing the radial dimension of the rotating electric machine 10A.

3. Modified Example

The embodiments have been described, while taking the rotating electric machines 10, 10A each in the form of the motor as examples. However, in the present embodiment, it is also possible to apply the rotating electric machine 10 or 10A to the generator as a modified example.

It is noted that the term "vertical," in the above description is not used in the exact meanings thereof. Specifically, this term "vertical," allow tolerances and errors in design and manufacturing and have meanings of "approximately vertical,".

In addition, techniques by the embodiment may be appropriately combined and utilized in addition to the examples having already described above.

In addition to that, although exemplification is not performed one by one, the embodiment is carried out by various changes being applied thereto without departing from the technical idea of the present disclosure.

What is claimed is:

1. A rotating electric machine comprising a rotor and a stator, comprising:
   a stator core comprising a teeth part; and
   an air core coil fitted to the teeth part, the air core coil comprising curved end surfaces configured to approximately define a part of cylindrical shape at inner radial side and outer radial side, the air core coil comprising approximately flat end surfaces at both circumferential sides and both axial sides,
   wherein the air core coil comprises
      four planar parts positioned at the both circumferential sides and the both axial sides, and
      four angular parts each positioned between the respective planar parts,
   wherein the air core coil is configured such that windings are arranged in alignment in the planar parts and each winding position of the windings is shifted in any two of the four angular parts, and
   wherein the air core coil is configured such that each curvature radius of the two angular parts where the winding position of the windings is shifted becomes larger than each curvature radius of the other two angular parts where the winding position of the windings is not shifted.

2. The rotating electric machine according to claim 1, further comprising
   a connection part disposed at the outer radial side or the inner radial side of a coil end part of the air core coil, the connection part being configured to connect lead ends of the air core coil.

3. The rotating electric machine according to claim 1, wherein the stator comprises the stator core comprising the teeth part and a yoke part in which an axial dimension of the yoke part is larger than an axial dimension of the teeth part.

4. The rotating electric machine according to claim 1, further comprising
   insulators disposed between the flat end surfaces at the both axial sides of the air core coil and a housing of the rotating electric machine in a tight contact state.

5. The rotating electric machine according to claim 4, further comprising
   a mold resin part formed by integrally molding the stator core, the air core coil, and the insulators.

6. The rotating electric machine according to claim 1, wherein the air core coil comprises the flat end surfaces of which each surface direction is perpendicular to a rotation axis of the rotor at the both axial sides.

7. The rotating electric machine according to claim 6, wherein the air core coil comprises a slot mounting part and a coil end part,
   wherein a circumferential cross section of the slot mounting part has approximately a fan shape in which a dimension enlarged radially outward, and
   wherein an axial cross section of the coil end part has approximately a rectangular shape.

8. The rotating electric machine according to claim 7, wherein the air core coil is configured such that a cross section of at least one winding of the slot mounting part and the coil end part has a shape plastically deformed from a round shape resulting from pressure molding.

9. The rotating electric machine according to claim 8, wherein the air core coil comprises two lead ends which are drawn radially outward or inward of the coil end part from the two angular parts at the one axial side or the two angular parts at the other axial side.

10. The rotating electric machine according to claim 9, wherein the lead end at winding start side is drawn from a first layer at the outer radial side of the air core coil at the one angular part at the one axial side, and wherein the lead end at winding end side is drawn from an outermost layer of the air core coil at the other angular part at the one axial side.

11. The rotating electric machine according to claim 9, wherein the lead end at winding start side is drawn from an outermost layer at the inner radial side of the air core coil at the one angular part at the one axial side, and wherein the lead end at winding end side is drawn from the outermost layer of the air core coil at the other angular part at the one axial side.

* * * * *